United States Patent
Hancock et al.

(10) Patent No.: US 6,536,794 B2
(45) Date of Patent: Mar. 25, 2003

(54) TOW HITCH ASSEMBLY FOR ALL-TERRAIN VEHICLES

(76) Inventors: Dennis H. Hancock, 5752 Silverstone Cir., Mountain Green, UT (US) 84050; Jeffrey D. Hancock, 6702 S. 1800 East, Uintah, UT (US) 94405

(*) Notice: Subject to any disclaimer, the term of this patent is extended or adjusted under 35 U.S.C. 154(b) by 0 days.

(21) Appl. No.: 09/910,613

(22) Filed: Jul. 23, 2001

(65) Prior Publication Data

US 2003/0015856 A1 Jan. 23, 2003

(51) Int. Cl.[7] ................................................. B60D 1/07
(52) U.S. Cl. ................... 280/511; 280/491.5; 280/416.1
(58) Field of Search ................................. 280/504, 511, 280/515, 491.5, 491.1, 415.1, 416.1

(56) References Cited

U.S. PATENT DOCUMENTS

| | | | | |
|---|---|---|---|---|
| 3,718,317 A | * | 2/1973 | Hilmer | 224/520 |
| 4,697,818 A | * | 10/1987 | Moore | 280/416.1 |
| 5,702,118 A | * | 12/1997 | Hanson et al. | 280/416.1 |
| 6,125,945 A | * | 10/2000 | Skaggs et al. | 172/439 |
| 6,312,004 B1 | * | 11/2001 | Kiss | 280/432 |
| 6,315,316 B1 | * | 11/2001 | Wyant | 280/415.1 |
| 6,390,489 B1 | * | 5/2002 | Friesen | 187/237 |

* cited by examiner

*Primary Examiner*—Kevin Hurley

(57) ABSTRACT

A tow hitch for all-terrain vehicles including an attachment leg with a hole therethrough for bolting of the attachment leg to a draw bar of the vehicle, a tow ball support leg with a pair of aligned, spaced apart holes adjacent to one end of the support leg and a tow ball having a threaded stem inserted through the one of said holes remote from the one end of the support leg to receive a nut thereon and structure to connect the attachment leg and the support leg in an offset relationship and with one structure connecting the attachment leg to the support leg comprising an insert box carried by the attachment leg and a box extension carried by the support leg and lockable into the insert box.

3 Claims, 3 Drawing Sheets

US 6,536,794 B2

TOW HITCH ASSEMBLY FOR ALL-TERRAIN VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

This invention relates to tow hitches for vehicles and particularly to tow hitches for use on all-terrain vehicles (ATVs).

2. Description of the Related Art

All terrain vehicles (ATV's) frequently are equipped with a rearwardly projecting, flat tow bar with a hole therethrough that will allow a trailer to be attached and pulled. Generally a bifurcated end of a tongue on the trailer straddles the flat tow bar and is secured to the tow bar with a pin dropped through holes in the bifurcated end and the hole in the tow bar.

Such hook-ups are not always satisfactory since a fully universal connection is not provided. Many trailers have a receptacle on the connector end of the trailer tongue that will fit over and be locked to a ball of a towing vehicle. This hook up will provide the desired universal connection, but if a ball is secured to the flat tow bar with as bolt inserted through the ball and the flat tow bar it must be removed before the flat tow bar can again be used with a trailer tongue having a bifurcated end. Also, the flat tow bar frequently does not have an attached ring to which a safety chain of a trailer tongue can be secured.

OBJECTS OF THE INVENTION

A principal object of the present invention is to provide a tow hitch that is readily secured to the flat tow bar of an ATV and that will then accommodate attachment of trailers having a safety chain on the trailer tongue and with either a ball receptacle or a bifurcated end on the trailer tongue.

FEATURES OF THE INVENTION

Principal features of the tow hitch of the invention include a first embodiment having an adapter receptacle with an attachment plate, an insert box and a safety chain ring. A ball support has an insert to fit into and to be pinned to the adapter receptacle and an extending plate with a hole through which a towing ball is mounted and a second hole to receive a pin to secure a clevis on the end of a trailer tongue to the tow hitch.

Another embodiment of the tow hitch of the invention includes an angled attachment plate having offset legs and with a safety chain ring.

DETAILED DESCRIPTION

Figure 1:
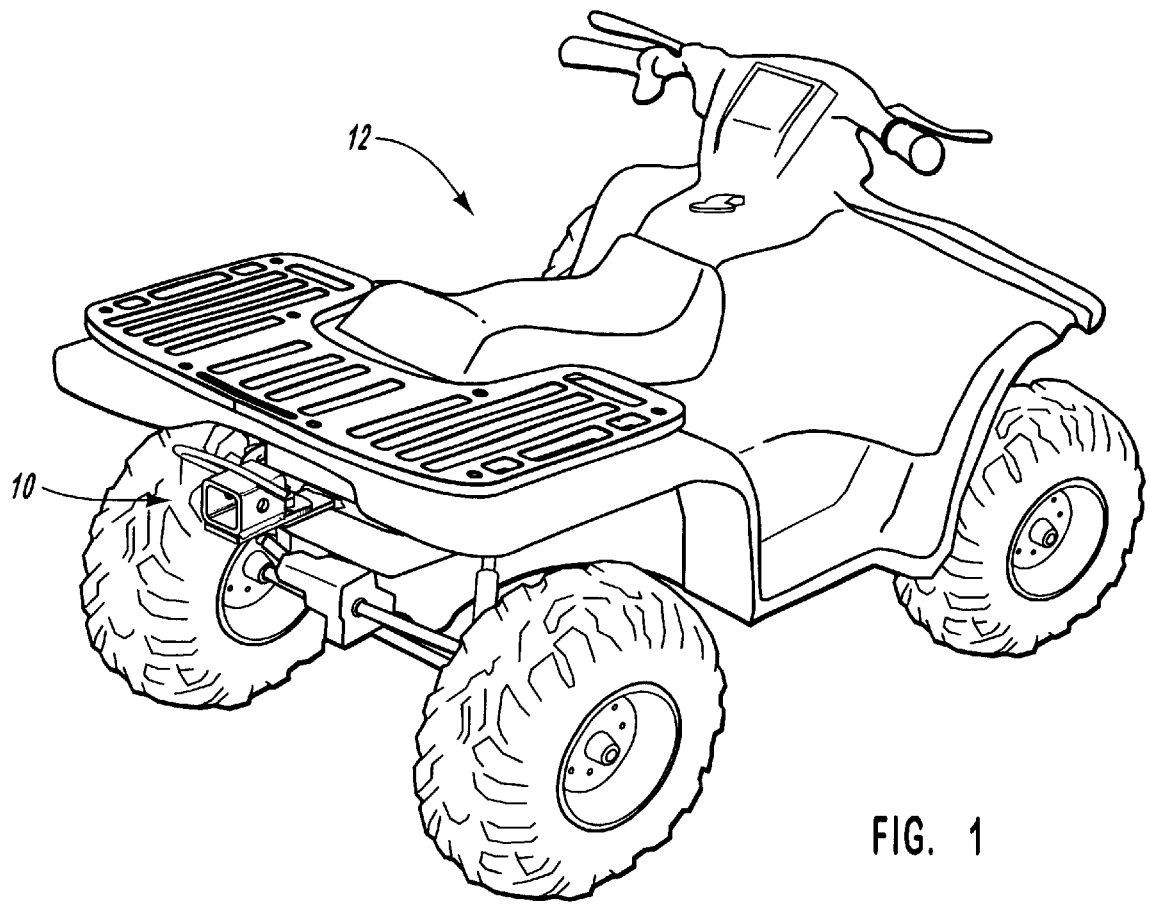
FIG. 1 is a perspective view, taken from the rear side of a typical all-terrain vehicle, with a tow hitch of the invention attached.
Figure 2:
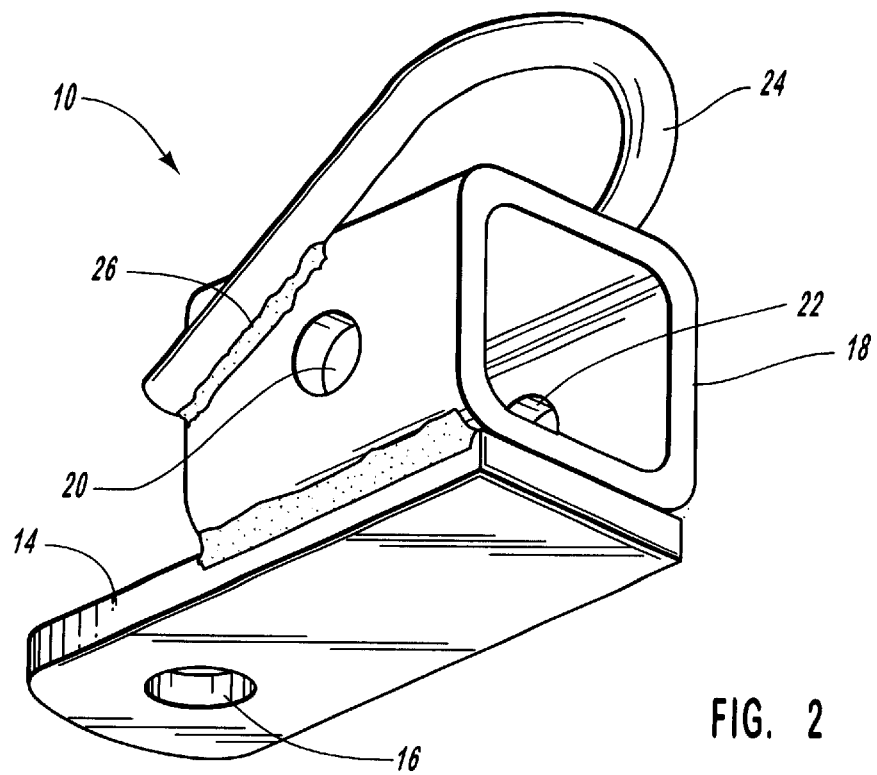
FIG. 2, a perspective view of a first embodiment of the tow hitch of the invention.
Figure 3:
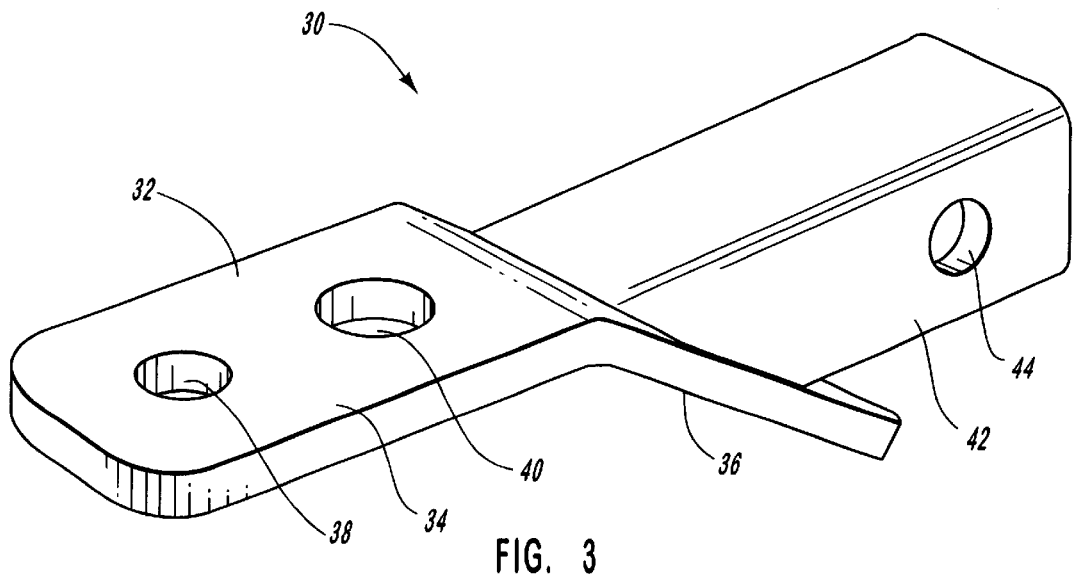
FIG. 3, a perspective view of the ball support of the hitch of FIG. 1.
Figure 4:
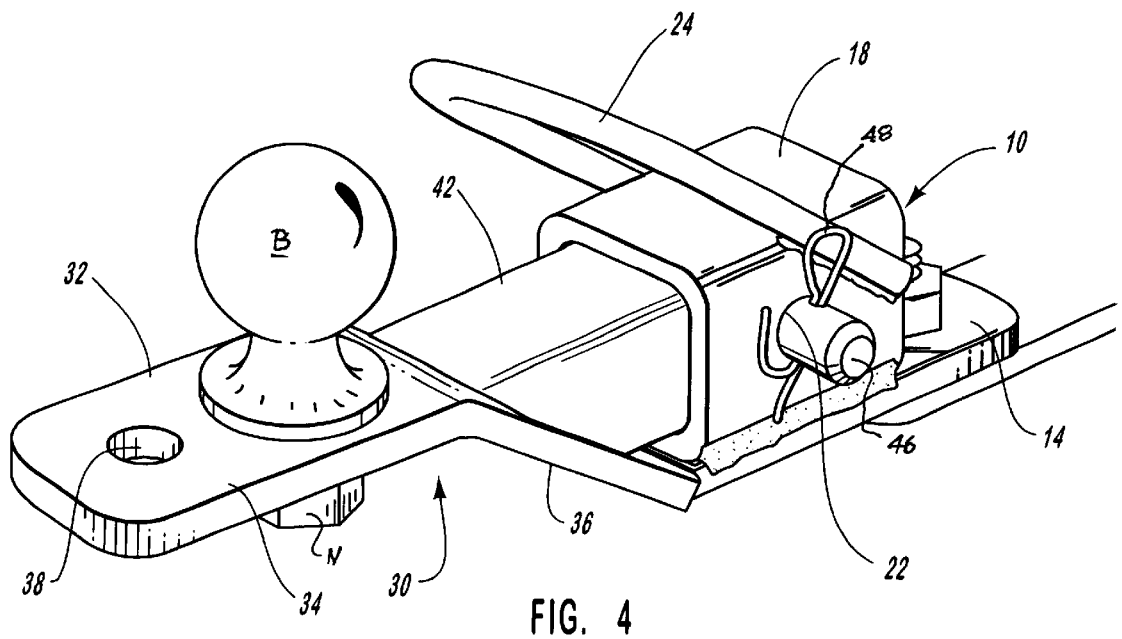
FIG. 4, a perspective view of the ball support of FIG. 3, with the insert therof inserted into the insert box.

Referring now to the drawings:

In the illustrated preferred embodiment of FIG. 1, the tow hitch 10 of the invention is attached to the draw bar projecting from the rear of an all-terrain vehicle (ATV), shown generally at 12. The tow hitch 10 includes an attachment leg 14 having a hole 16 therethrough, adjacent to one end of the leg. An insert box 18 is welded to the attachment plate 14 at an opposite end of the attachment plate. Aligned holes 20 and 22 are provided through side walls of the insert box 18. A U-shaped length of rod has its legs welded at 26 to the insert box 16 to form a safety chain attachment ring 24.

A ball support leg 30 includes an extending plate 32 with a pair of spaced apart holes 38 and 40 therethrough. The ball support leg is angled at 36 to provide a welding base for a box extension 42 to have one end welded thereto. The box extension is sized to fit snugly into the insert box 18 and has a hole 44 therethrough, through which a locking pin 46, that is also pushed through the holes 20 and 22 is inserted. A cotter pin 48 is inserted through an end of the locking pin to secure the pin in place. A threaded stem of a tow ball B is inserted through hole 40 and a nut N is threaded onto the stem to secure the tow ball in place. With the ball in place and ready to receive a hitch receptacle on the end of a trailer tongue the hole 38 is still available to receive a locking pin in the event a trailer tongue having a bifurcated end is to be attached, rather than a trailer having a tongue with a hitch receptacle.

Figure 5:
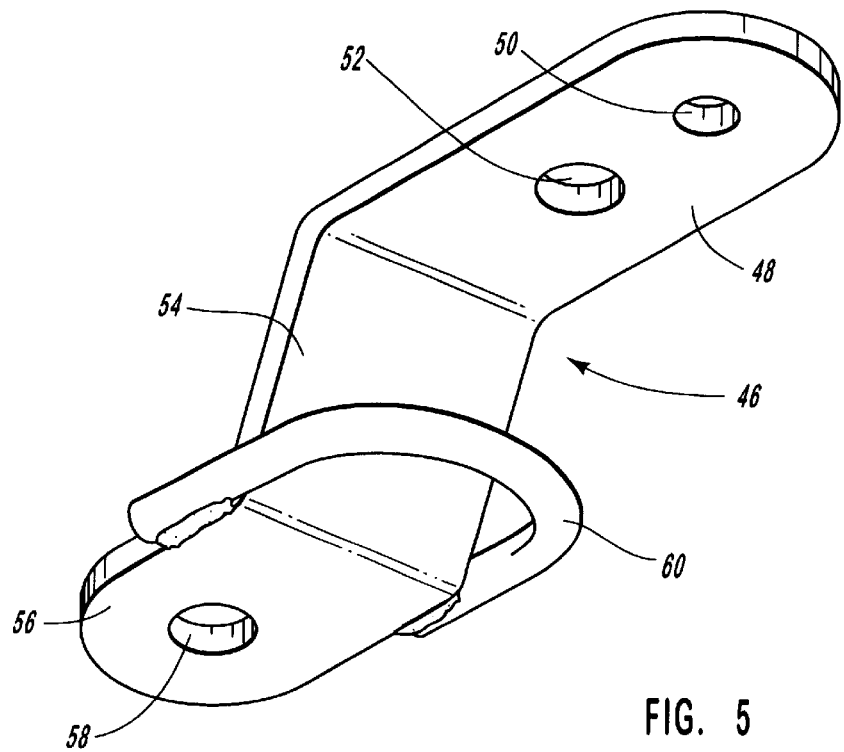
FIG. 5, a perspective view of a second embodiment of the tow hitch of the invention.

In the embodiment of FIG. 5 the tow hitch 46 of the invention includes a ball support leg 48 with spaced apart holes 50 and 52, a connector leg 54 and an attachment leg 56 having a hole 58 therethrough. Connector leg 54 interconnects the straight legs 48 and 56, which are offset with respect to one another. A U-shaped length of rod has its legs welded to the outsides of attachment leg 56 to form a safety chain ring 60.

Figure 6:
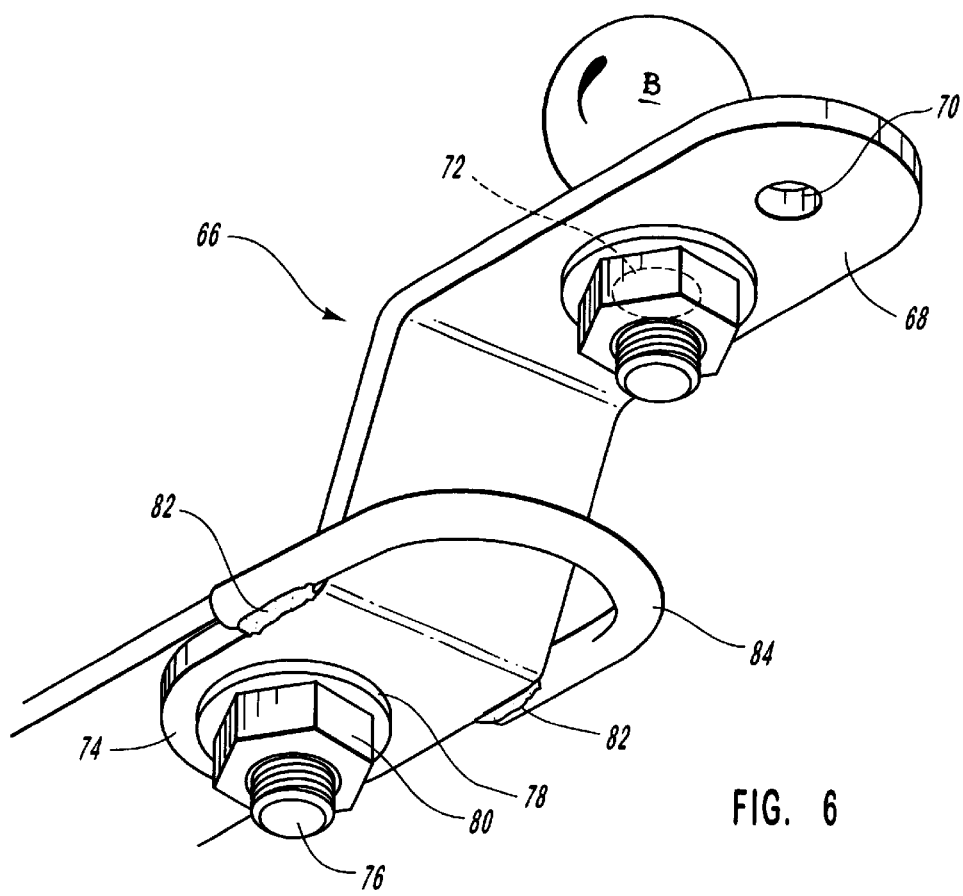
FIG. 6, a perspective view of the tow hitch of FIG. 5 secured to a draw bar of an all-terrain vehicle and with a ball in place.

As shown in FIG. 6, a tow hitch 66, corresponding to the hitch 46 of FIG. 5 has a ball support leg 68 with holes 70 and 72 therethrough. The threaded stem of a tow ball B is inserted through hole 72 and a nut N is threaded onto the stem to secure the tow ball in place. A trailer having a tongue with a ball receptacle mounted thereon can be secured to the ball for towing purposes. Hole 70 will permit attachment of a trailer tongue having a bifurcated end, in the manner previously explained. An attachment leg 74 is offset from the ball support leg 68 and is bolted by a bolt 76 washer 78 and nut 80 to a drawbar of an ATV. A U-shaped length of rod has its ends welded at 82 to opposite sides of the attachment leg 74 to form a safety chain ring.

It will be apparent that in use the embodiment of tow hitches disclosed herein may be used to position the attachment leg either above or below the draw bar of an ATV to which the leg is attached. Also, the tow ball can be positioned to be at opposite sides of the ball support leg and the tow hitch may be turned upside down to change the position of the tow bar support leg from above to below the level of the attachment leg.

Although a preferred form of our invention has been herein disclosed, it is to be understood that the present disclosure is by way of example and that variations are possible without departing from the subject matter coming within the scope of the following claims, which subject matter we regard as our invention.

We claim:

1. A tow hitch to be secured to the draw bar of an all terrain vehicle, comprising an attachment leg having a hole therthrough to receive a bolt securing said said attachment leg to the draw bar at the rear of the ATV;

a tow bar support leg offset from said attachment leg and having a pair of holes therethrough, said holes being aligned along the length of said tow bar support leg and adjacent to one end of said tow bar support leg;

means interconnecting said attachment leg and an opposite end of said tow bar support leg; and a tow ball having a threaded stem inserted through the one of said holes remote from said one end of said tow ba support leg; whereby said tow bar support leg end having said other hole therethrough projects past said attachment leg.

2. A tow hitch as in claim 1, wherein the means interconnecting said attachment leg and the opposite end of the tow bar support leg is an angled arm.

3. A tow hitch as in claim 1, wherein the means interconnecting the attachment leg and the opposite end of the tow bar support leg comprises an insert box fixed to said attachment leg and receiving the one end of said tow bar support leg and means locking said one end of said tow bar support leg in said insert box with the other end of said tow bar support leg projecting therefrom to position the other hole spaced from said attachment leg and said insert box.

* * * * *